May 9, 1933. R. L. FEAGLES ET AL 1,907,770
FLUID CONTAINER
Filed Dec. 28, 1929

INVENTOR.
R. L. Feagles and
W. E. Penrod
BY
Elwin M. Hulse
ATTORNEY.

Patented May 9, 1933

1,907,770

UNITED STATES PATENT OFFICE

RALPH L. FEAGLES AND WALTER E. PENROD, OF FORT WAYNE, INDIANA, ASSIGNORS TO CHALFANT CAN COMPANY, OF FORT WAYNE, INDIANA, A CORPORATION OF INDIANA

FLUID CONTAINER

Application filed December 28, 1929. Serial No. 417,071.

The invention relates to fluid containers and it is particularly directed to containers for storing and transporting milk and cream and to the lid or cover thereof.

The object of the invention is to provide a lid or cover for a container having a constricted neck which is air tight when installed in the neck and is provided with means to automatically vent the container upon the accumulation of gaseous pressure therein.

Figure 1:
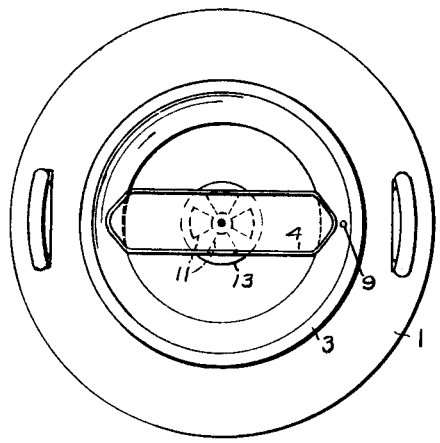
Figure 2:
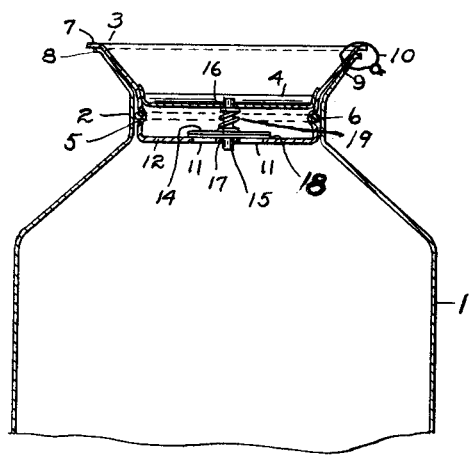

The invention consists in the novel features hereinafter described and illustrated in the accompanying drawing and in which drawing Figure 1 is a plan view of a container having the invention applied thereto and Fig. 2 a vertical central cross-section of the same.

Referring to the illustrative embodiment of the invention 1 represents a receptacle having a constricted neck 2 such as is commonly in use for storing and transporting milk and cream. The lid 3 is cup-shaped and is inserted into the neck 2, a handle 4 secured at its opposite ends to the annular side wall of the lid facilitating the installation or removal of the lid. An annular channel or groove 5 is formed in the annular side wall of the lid and receives a suitable gasket 6 preferably formed of rubber. A lateral flange 8 is formed at the top of the neck 2 and a corresponding flange 7 is formed on the lid which overlies the flange 8 when the lid is installed. Apertures 9 are formed in the flanges respectively through which when they are alined a seal 10 or other form of lock may be inserted to prevent unauthorized removal of the lid.

Suitable apertures 11 are formed in the bottom 12 of the lid and so arranged that the valve 13 will cover them. The valve 13 consists of a disk 14 secured to a stem 15 the opposite ends of which stem extend through the apertures 16 and 17 in the handle 4 and in the bottom 12 respectively. A rubber disk or other form of gasket 18 is secured to the bottom of the disk 14 and a spring 19 is coiled about the stem 15 and engages the handle and the valve 13 and tends to seat the valve 13 on the bottom to normally close the ports 11. The tension of the spring 19 is predetermined so that when any fluid pressure within the container reaches a selected amount it will overcome the tension of the spring and unseat the valve and thereby permit the excess of fluid to escape whereby to prevent injury to the container or the blowing out of the lid and consequent loss of the contents of the container.

It will be noted that the valve 13 is located between the bottom and the top or margin of the lid, hence stacking of the containers is not interfered with. The handle 4 is wide enough to fully prevent the dislodgment of the valve. The gasket 6 effectively seals the lid in the container and accomplishes an air tight can for milk and cream.

What we claim is:

1. A fluid container comprising a receptacle having a neck, a cup-shaped lid adapted to be engaged in the neck, ports in the bottom of the lid, a spring opposed valve to control said ports and contained within the lid and a gasket carried by the lid and normally projecting laterally from the side wall thereof to form a fluid tight joint between the lid and said neck.

2. A fluid container comprising a receptacle having a constricted upper portion, a cup-shaped lid adapted to be engaged in said restricted portion, ports in the bottom of the lid, a cross-member in the lid and spaced from the bottom, a valve to control the ports having its stem extending through said bottom and said handle, a spring engaging the handle and the valve and a gasket mounted on the side walls of the lid and normally projecting laterally from said wall to seal said lid in said constricted portion, the valve being entirely below the upper edge of the lid.

3. A fluid container comprising an open top receptacle, a cup-shaped lid adapted to be engaged in the open top, an annular rubber gasket carried by the side wall of the lid and normally projecting laterally from said wall to seal the lid in said top, a cross-member in the top below the upper edge of said top, ports in the bottom of the lid and a valve to automatically control the ports, said valve being between the cross member and the bottom of the lid.

In witness whereof we have hereunto signed our names.

RALPH L. FEAGLES.
WALTER E. PENROD.